United States Patent [19]

Andersen

[11] Patent Number: 5,058,154
[45] Date of Patent: Oct. 15, 1991

[54] TELEPHONE HANDSET HAVING A PURE ACOUSTIC RESISTANCE CONNECTION

[75] Inventor: Morten K. Andersen, Odder, Denmark

[73] Assignee: Alcatel Kirk A/S, Horsens, Denmark

[21] Appl. No.: 424,664

[22] Filed: Oct. 20, 1989

[30] Foreign Application Priority Data

Oct. 21, 1988 [DK] Denmark .................... 5879/88

[51] Int. Cl.$^5$ .................... H04M 1/00; H04R 25/00
[52] U.S. Cl. .................... 379/433; 381/153; 381/158
[58] Field of Search .............. 379/433, 437, 451, 440; 381/153, 157, 158, 159, 168, 169; 181/157, 158, 150, 151, 130

[56] References Cited

U.S. PATENT DOCUMENTS

| | | | |
|---|---|---|---|
| 2,109,751 | 9/1935 | Warnke | 179/102 |
| 3,632,903 | 1/1972 | Lange, Jr. | 381/183 |
| 4,349,082 | 9/1982 | Gastmeier | 181/130 |

FOREIGN PATENT DOCUMENTS

| | | | |
|---|---|---|---|
| 0217752 | 10/1985 | Japan | 379/433 |
| 1139189 | 6/1986 | Japan | 379/433 |

OTHER PUBLICATIONS

L. L. Bernanek, *Acoustics*, McGraw-Hill, New York, 1954, pp. 11, 133, 134.

*Primary Examiner*—Jin F. Ng
*Assistant Examiner*—William Cumming

[57] ABSTRACT

The present invention relates to a telephone handset using an acoustic low impedance receiver transducer. A good reproduction of the low frequencies is obtained by introducing a front cover (7) having pure acoustic ohmic connections (8, 14) from the front side of the transducer diaphragm to the space (9) within the handset house (2).

10 Claims, 2 Drawing Sheets

TELEPHONE HANDSET HAVING A PURE ACOUSTIC RESISTANCE CONNECTION

TECHNICAL FIELD

The present invention relates to a telephone handset.

CLAIM FOR PRIORITY

This application is based on and claims priority from an application first filed in Denmark on 21 Oct. 1988 under Ser. No. 5879/88. To the extent such prior application may contain any additional information that might be of any assistance in the use and understanding of the invention claimed herein, it is hereby incorporated by reference.

BACKGROUND ART

In telephone subsets there are mostly used acoustic high impedance transducers. This type of transducer is a fully closed unit with no connections to the inner space of the handset house. When using a high impedance transducer in a telephone subset there will be no or only very little reproduction of the bass range (the low frequencies) and the reproduced voice or music has a metallic sound. The reason for this missing bass reproduction is that when using a telephone there will always be a leak between the handset and the ear (there is no hermetic closure) and this even small leakage will effectively remove the whole bass range. When telephone handsets are tested there is used an artificial ear which is hermetically connected to the telephone handset, whereby the measurements show the correct bass content. There is in effect no or only very little correspondence between the measured and the real situation for the bass range.

The invention relates in particular to telephone handsets using transducers of the acoustic low impedance type. An acoustic low impedance transducer is not a closed unit and makes use of the space which is available behind the transducer. The purpose of using an acoustic low impedance transducer is to obtain a better and more natural reproduction of sound. The acoustic low impedance transducer can tolerate a little leakage between the ear and the telephone handset without losing the bass range.

The acoustic low impedance transducers are used in hi-fi headphones where the situation is different from telephone sets. Headphones have an open structure, whereas it is desirable that a telephone handset is closed in order to prevent the speech of the transmitting subscriber from being overheard by a third person in the receiving end and shielding the ear from surrounding noise.

DISCLOSURE OF INVENTION

The object of the present invention is to provide a telephone handset, which when using an acoustic low impedance transducer will give a telephone receiver a better sound reproduction more like the sound reproduction of hi-fi headphones. The main features of the invention are defined in the accompanying patent claims.

In accordance with the invention there is used a transducer front cover which is mounted on an acoustic low impedance transducer in order to make use of the inner space in a telephone handset. Acoustically sound transfer function from the transducer to the ear is the same as the transfer function which may be measured between two persons who talk with each other at the distance of one meter. (Reference: CCITT Working Party XII/1, Delayed Contribution No. D49, Geneva, 23rd Apr. –21st May 1987, Question 12/XII, Source: Brüel & Kj r). This is desirable because there is obtained a more natural reproduction of the speech and sound than what is possible from a conventional telephone. This is achieved by an acoustic connection from the front side of the transducer diaphragm to the inner space of the telephone handset via a pure acoustic ohmic resistance. By ensuring that this connection is a pure acoustic ohmic connection the lower frequency range will have low impedance without adding undesired resonances in the higher frequency range.

BRIEF DESCRIPTION OF DRAWINGS

The above and other features and objects of the present invention will become more apparent from the following detailed description of certain presently preferred embodiments of the invention taken in conjunction with the drawings, where.

BEST MODE FOR CARRYING OUT THE INVENTION

Figure 1:
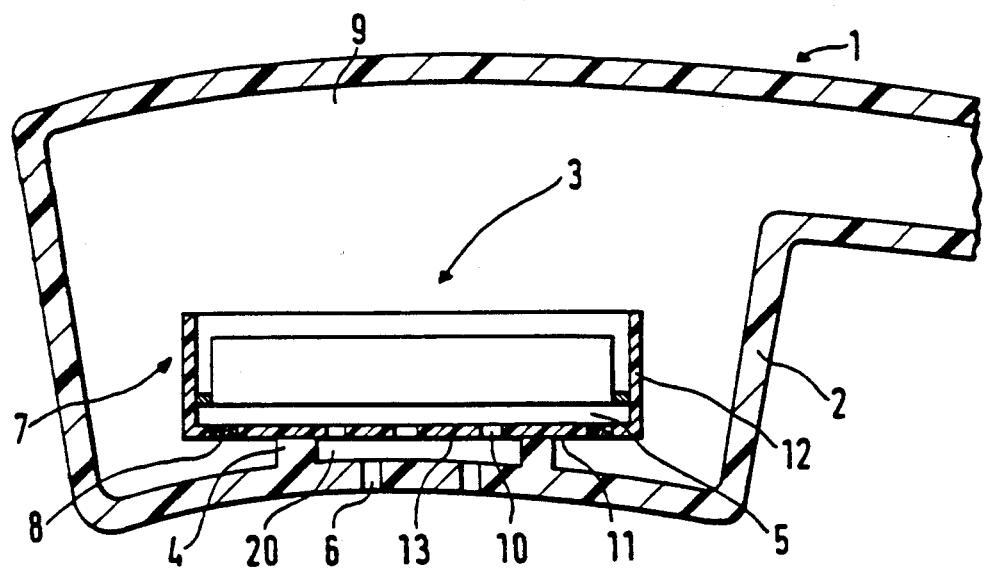
FIG. 1 shows the principles of the invention.

In FIG. 1 is schematically illustrated a telephone handset 1 which comprises a housing 2 in which there is arranged a low impedance transducer 3. The transducer 3 is secured in a front cover 7 so that there from the front side of the transducer diaphragm 5 is a normal slot connection to holes or apertures 6 in the housing 2. The front cover 7 is secured to a ring shaped support surface 4 in the housing 2 in such a way that there is established a pure acoustic ohmic connection 8 from the front side of the transducer diaphragm to the space 9 within the housing 2, while maintaining a normal slot connection 10 from the front side of the diaphragm to the holes or apertures 6 in the housing 2. Between the holes 10 of the front cover and the holes 6 of the housing 2 there is a space 20. The front cover 7 comprises a surface 11 which separates the acoustic ohmic connection 8 from the normal slot connection 10 by letting the surface 11 close tightly against the support surface 4 along the whole periphery. The front cover 7 has the shape of an open cylindrical, preferably circular, box having side walls 12 and a bottom surface 13 adapted to the transducer 3 which may be integrated with the transducer.

Figure 2:
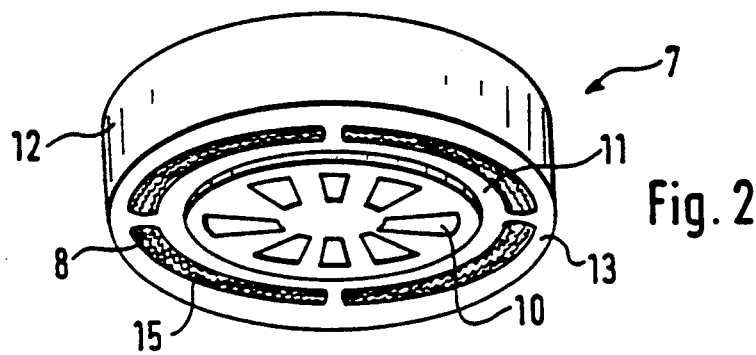
FIGS. 2 and 3 show alternative embodiments of the front cover.
Figure 3:
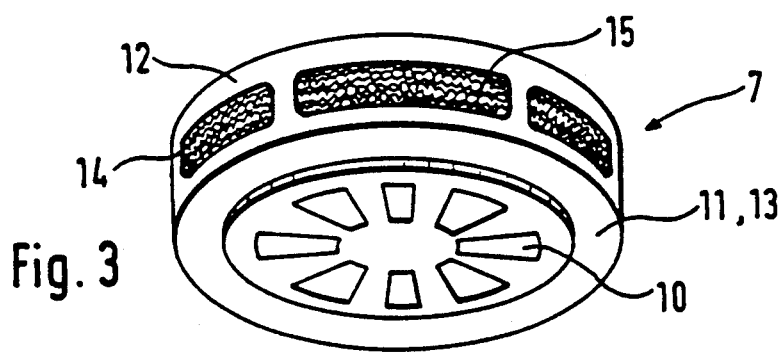

As shown in FIGS. 1 and 2 the acoustic ohmic connection 8 may be formed in the bottom surface 13 of the front cover, i.e. in the part of the front cover which is practically parallel with the plane 5 of the transducer diaphragm. Alternatively, and as shown in FIG. 3, the acoustic ohmic connection 14 may be formed in the side wall 12 of the front cover. If the cylindrical front cover has a polygon cross section instead of a circular cross section the connections 14 may be arranged in a plurality or all of the sides. Alternatively the acoustic ohmic connections 8, 14 may be formed in the bottom 13 as well as in the side wall(s) 12 of the front cover 7.

As will be seen from the drawings the acoustic ohmic connection is formed as a number of preferably evenly distributed apertures or slots 8, 14 in the front cover 7. The apertures should have as large an area as practical. The apertures or slots 8, 14 are wholly or partly filled or covered with a sound absorbing material 15 such as cotton wool, foamed rubber or the like with relatively low air resistance. The side walls 12 and the bottom surface 13 of the front cover should be as thin as practically possible, in particular in the area close to the ohmic acoustic apertures 8, 14.

Figure 4:
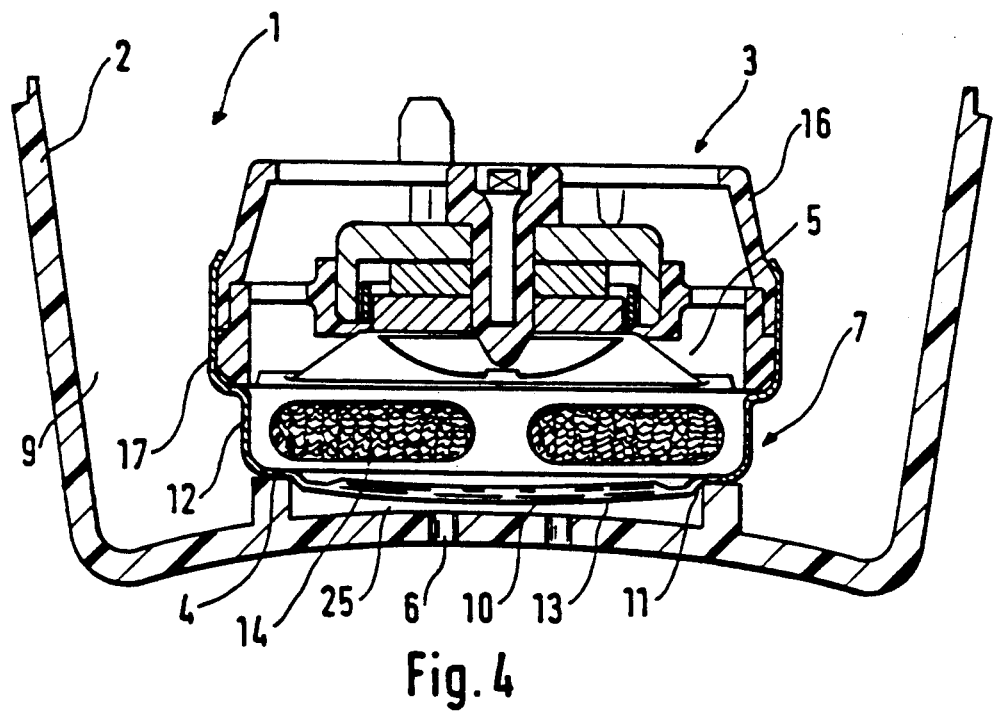
FIG. 4 shows a telephone handset in some greater detail.

In FIG. 4 an embodiment of the invention is shown in greater detail. The ohmic acoustic connections 14 are arranged in the side walls 12 of the front cover. In this embodiment the front cover 7 is integrated with a low impedance transducer 3 and the front cover 7 encloses the edge of the transducer back cover 16. The diaphragm 5 of the transducer is mounted by means of a diaphragm ring 17 which rests against the front cover 7. The surface 11 on the front cover 7 fits tightly against the ring surface 4 on the housing 2, so that the connection from the front side of the front cover through the slots 10 in the front cover to the holes 6 in the housing 2 is fully separated from the connection from the front side of the diaphragm through the ohmic acoustic connection 14 to the space 9 within the house 2. As in FIG. 1 there is a space 25 between the front cover holes 10 and the holes 6 in the housing 2.

Figure 5:
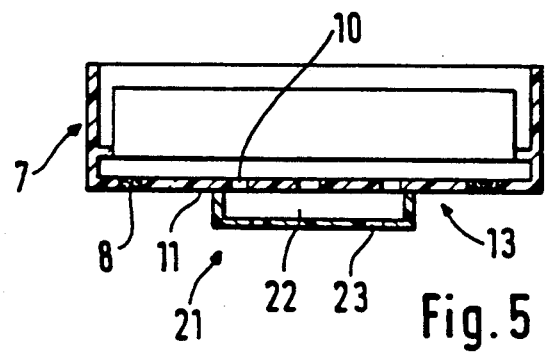
FIG. 5 shows an alternative embodiment of the front cover.

In FIG. 5 is illustrated an alternative embodiment of the front cover 7. The bottom surface 13 of the front cover is provided with a subcover 21 which defines a space 22 corresponding substantially to the space 20 in FIG. 1. The subcover may also be made to fit the space 25 in FIG. 4. The subcover 21 is provided with apertures 23 which corresponds to the holes or apertures 6 in the housing 2. The transducer 3 with front cover 7 will have to be rotated in order to obtain a complete correspondence between these two sets of holes. The purpose of providing the front cover with the subcover is to make sure that the sound reproduction is not disturbed by undesired configurations of the space 20 in FIG. 1 and 25 in FIG. 4.

As mentioned, the front cover should have a small wall size so that it together with the damping material will treat the sound uniformly in the whole frequency range. A wall thickness of about 0.3 mm will be suitable and the front cover may be made from steel sheet. As an alternative the front cover can also be made from some plastic material that should be molded such that the edges of the holes 8, 14 have a wall thickness so that the total attenuation takes place in the molded holes and connections.

The geometry of the connections 8, 14 is not so important when the area is as large as possible and when the connections are provided with a mesh filter. As mesh can be used pieces of very fine woven fabric. The air penetrability of this mesh should be determined in accordance with the type of transducer used, but it should be rather high. Cotton wool or foamed rubber may be used as damping material. The main feature of the damping materials to be used is that they must attenuate the sound uniformly over the whole frequency range.

The advantage of the front cover as described above is that it can be used in existing handsets. There is obtained a more realistic reproduction of sound which is nearly independent of the design of the telephone handset. With this invention it is now possible to use a low impedance telephone with a closed telephone handset. A further advantage is that electronic filters are not necessary and the handset is therefore more economic than known handsets with regard to the space required and to the current consumption.

The above detailed description of embodiments of this invention must be taken as examples only and should not be considered as limitations on the scope of protection.

I claim:

1. Telephone handset comprising
a housing having at least one external aperture;
a receiver transducer including a diaphragm having a front surface; and
a front cover between said front surface and said external aperture for providing
 a first acoustic connection having a pure acoustic ohmic resistance between the front diaphragm surface and an interior space within the housing, and
 a second acoustic connection between the front diaphragm surface and the external aperture.

2. Handset according to claim 1, wherein
the housing defines an interior surface in the vicinity of the external aperture, and
the front cover defines an outer surface which fits tightly against the inner surface, so as to separate the first acoustic connection from the second acoustic connection.

3. Handset according to claim 2, wherein
the front cover has a cylindrical side wall portion and a bottom surface for defining a box containing the transducer.

4. Handset according to claim 3, wherein
a first plane defined by said diaphragm is substantially parallel to a second place defined by said bottom surface, and
the first acoustic connection is formed in the bottom surface of said box.

5. Handset according to claim 3, wherein
the first acoustic connection is formed in the sidewall portion of said box.

6. Handset according to claim 3, wherein
the first acoustic connection is formed in both the bottom surface and the side wall portion of said box.

7. Handset according to claim 1, wherein
the first acoustic connection is constituted by a plurality of apertures in the front cover.

8. Handset according to claim 7, wherein
said plurality of apertures contain a sound absorbing material such as cotton wool, foamed rubber or the like having a relatively low air resistance.

9. Handset according to claim 7, wherein
the front cover has a thickness which is as thin as practically possible in the vicinity of said plurality of apertures.

10. Telephone handset comprising
a housing having at least one external aperture;
a receiver transducer including a diaphragm having a front surface:
a front cover between said front surface and said external aperture for providing
 a first acoustic connection having a pure acoustic ohmic resistance between the front diaphragm surface and an interior space within the housing, and
 a second acoustic connection between the front diaphragm surface and the external aperture, said second acoustic connection further comprising at least a second aperture in the front cover; and a subcover having an interior surface which, in combination with said external surface of the front cover, defines a second space between an external surface of the front cover including said second aperture and an interior surface of the housing including said external aperture, and a third aperture in direct acoustic communication with said external aperture.

* * * * *